(12) United States Patent
Chien

(10) Patent No.: US 7,677,745 B2
(45) Date of Patent: Mar. 16, 2010

(54) LIGHT DEVICE WITH EL ELEMENTS

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 11/184,771

(22) Filed: Jul. 20, 2005

(65) Prior Publication Data

US 2006/0018110 A1 Jan. 26, 2006

Related U.S. Application Data

(63) Continuation of application No. 10/286,871, filed on Nov. 4, 2002, now Pat. No. 6,976,762, which is a continuation-in-part of application No. 10/170,584, filed on Jun. 14, 2002.

(51) Int. Cl.
*F21K 2/00* (2006.01)

(52) U.S. Cl. ........................................ 362/84

(58) Field of Classification Search ............ 313/318.04, 313/506, 512, 511; 362/84, 226
See application file for complete search history.

(56) References Cited

U.S. PATENT DOCUMENTS

| | | | | |
|---|---|---|---|---|
| 3,317,722 A | * | 5/1967 | Whitney | 313/512 |
| 5,383,100 A | * | 1/1995 | Kikos | 362/34 |
| 5,485,355 A | * | 1/1996 | Voskoboinik et al. | 362/84 |
| 5,711,594 A | * | 1/1998 | Hay | 362/84 |
| 5,869,930 A | * | 2/1999 | Baumberg et al. | 313/506 |
| 5,957,564 A | * | 9/1999 | Bruce et al. | 362/84 |
| 6,255,763 B1 | * | 7/2001 | Wright | 313/318.04 |
| 6,322,228 B1 | * | 11/2001 | Feldman | 362/84 |
| 6,771,021 B2 | * | 8/2004 | Cok | 313/512 |
| 6,779,913 B2 | * | 8/2004 | Niezrecki et al. | 362/473 |
| 6,997,573 B2 | * | 2/2006 | Maese | 362/84 |
| 7,001,035 B2 | * | 2/2006 | Kawakami | 362/617 |

* cited by examiner

*Primary Examiner*—Anabel M Ton
(74) *Attorney, Agent, or Firm*—Bacon & Thomas, PLLC

(57) ABSTRACT

A light device with EL element(s) includes non-illuminated conductive-piece(s) and connectors in addition to illuminated element to provide an economical, attractive, and neat illumination arrangement. The EL elements may be combined with a bend-and-shape member to enable the EL element(s) to be bent into any geometric configuration and maintain the shape into which it has been bent. The thus formed EL element(s) can be applied to an EL light device with a lamp base, a night light with bend-n-shape properties, and/or outdoor lighting at a most reasonable cost and utilizing any desired power source such as a wall outlet, battery, solar, or any other energy sources for people to use anywhere with lowest power consumption and incredible light effects. The said EL element(s) may also include electric signal delivery parts, reinforced mesh tube, and coil spring kits to deliver digital signals, current, data, images, or sound from end(s) to end(s).

5 Claims, 4 Drawing Sheets

US 7,677,745 B2

LIGHT DEVICE WITH EL ELEMENTS

Figure 1:
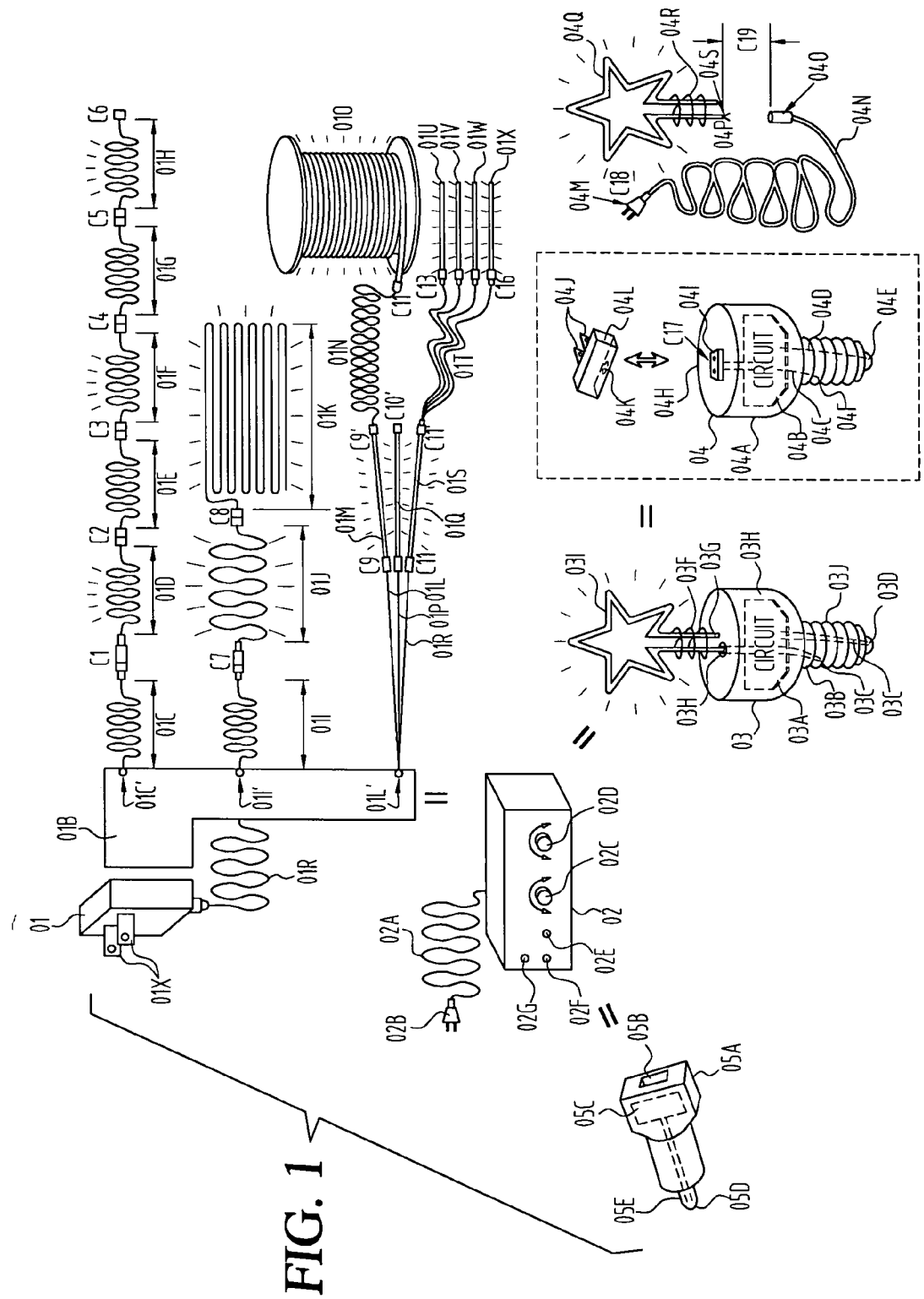

This application is a continuation of U.S. patent application Ser. No. 10/286,871, Nov. 4, 2002 now U.S. Pat. No. 6,976,762, which is a continuation-in-part of U.S. patent application Ser. No. 10/170,584, filed Jun. 14, 2002.

BACKGROUND

The same inventor's prior U.S. Pat. No. 6,168,282 discloses a lamp holder on which any conventional light means with desired electro-luminescent (hereafter as EL) element(s) can be installed. The electro-luminescent (EL) element's circuit can be inside the lamp holder housing or the circuit can be inside a separated adaptor which has a receptacle and lamp base arranged to fit into an existing available lamp holder.

The same inventor's prior U.S. Pat. No. 6,082,867 discloses an electro-luminescent (EL) element with a three-dimensional light emitting angle that incorporates, by means of a simple striping procedure, circuit means and attachment means surrounding the body.

The current invention improves upon the inventor's prior by providing a specially-designed electro-luminescent (EL) element which has an internal bend-and-shape member that allows the element to bend in any direction and maintain the shape for a period of time. The bend-and-shape member can include metal wires to sealed inside or situated outside an elongate body of the EL element to provide the shape-maintaining function. The bend-and-shape member can be positioned at any location of the element's cross-section, for example at the center or edge, or outside the element's body. Instead of adding metal wires to the element, the bend-and-shape property can be obtained by adding some chemical particles to said element. Alternatively, the same or equivalent bend-and shape properties may be obtained by applying a special plastic treatment on the element's body in a manner similar to conventional market bend-and-shape drinking straws.

The current invention provides an improvement on the principle of adding a bend-and-shape member added to the electro-luminescent (EL) element(s), by incorporating the bend-and-shape EL element with a lamp base to become a new light source for any type of the existing lamp with lamp holder, so as to provide a brand new neon-like light device with bend-and-shape and non-breakable features to be used by a consumer as an accent light for their indoor and outdoor lighting device. The lighting device may have desired pre-determined light functions such as sound activated light, sensor activate light, timer activated light, color changing, fade-in and fade out light effects, chasing, steady on, flashing, and other conventional functions which are available in the marketplace.

The current invention also can apply the bend-and-shape electro-luminescent (EL) element for use as a night light. This embodiment can allow the night light to have a variable shape at any time, to overcome the limitation that all existing night lights have a fixed shape, design, and illumination area. A user can change the element shape changing simply by bending the element, and maintain the shape as desired until the next time the user wishes to change it. This kind of night light can have an EL element on the circuit housing or away from the circuit housing for different applications. At least one conductive-piece added between the circuit housing and EL element permits the EL elements to be located away from the circuit housing so that the EL element positioned at any location on a wall while locating the power source and circuit at the wall outlet receptacle location.

The current invention also can apply the bend-and-shape electro-luminescent (EL) element to a battery powered light device. This results in a battery powered light device with design, shape, function, illumination area, function, and orientation that are changeable whenever a consumer decides to bend the device to a desired geometric configuration. This will greatly increase the value of the battery operated light device because the light can be changed whenever people want to change it.

The current invention also can be incorporated with a conventional light device having bend-and-shape features and non-breakage properties as long as a power source is available to supply the electricity to the said electro-luminescent (EL) element's circuit. Incorporating the installation means allows the bend-and-shape element(s) to be installed at any position and therefore increase the value of the light device. For example, the current invention may be incorporated with a night light device having prong means to get electricity from a wall outlet to power the element's circuit, a battery operated device having a battery to supply electricity from the battery to the element's circuit, or a lamp holder device with contact means to get electricity from the device to the element's circuit. The invention may be applied to all kinds of electric device from conventional markets, such as a toys gift, time piece, timer, home electric appliance, indoor electric device, or outdoor electric device, which are powered by electricity and can accommodate the bend-and-shape electro-luminescent element(s), the electricity being supplied to the EL element's circuit to provide a pre-determined function, light function, brightness, and/or timing for unbelievable light effects and value for consumer illumination design.

The current invention also provides a multiple function EL element which has a cross section with different geometric configurations. The multiple function EL elements have electric signal delivery parts within the EL elements which can delivery electric signals including phone signals, current for a light source, and digital signals for communication/computer/camera image, data, and/or sound etc. The electric signals delivery parts may have any number such as at least 1 to N where N=any number as long as the parts can put within the element body.

The current invention for the multiple function EL elements can have any combination extra functions created by the (1) bend-and-shape member, (2) signal delivery parts, (3) reinforcing net tube, (4) elastic coil kit, (5) (6) other EL element kits, and (7) other cosmetic accessories in a nice and neat arrangement.

DRAWINGS

FIG. 1 is a partially isometric and partially schematic view of a first preferred embodiment of a lighting device with a plurality of EL elements and a conductive piece combination.

Figure 2:
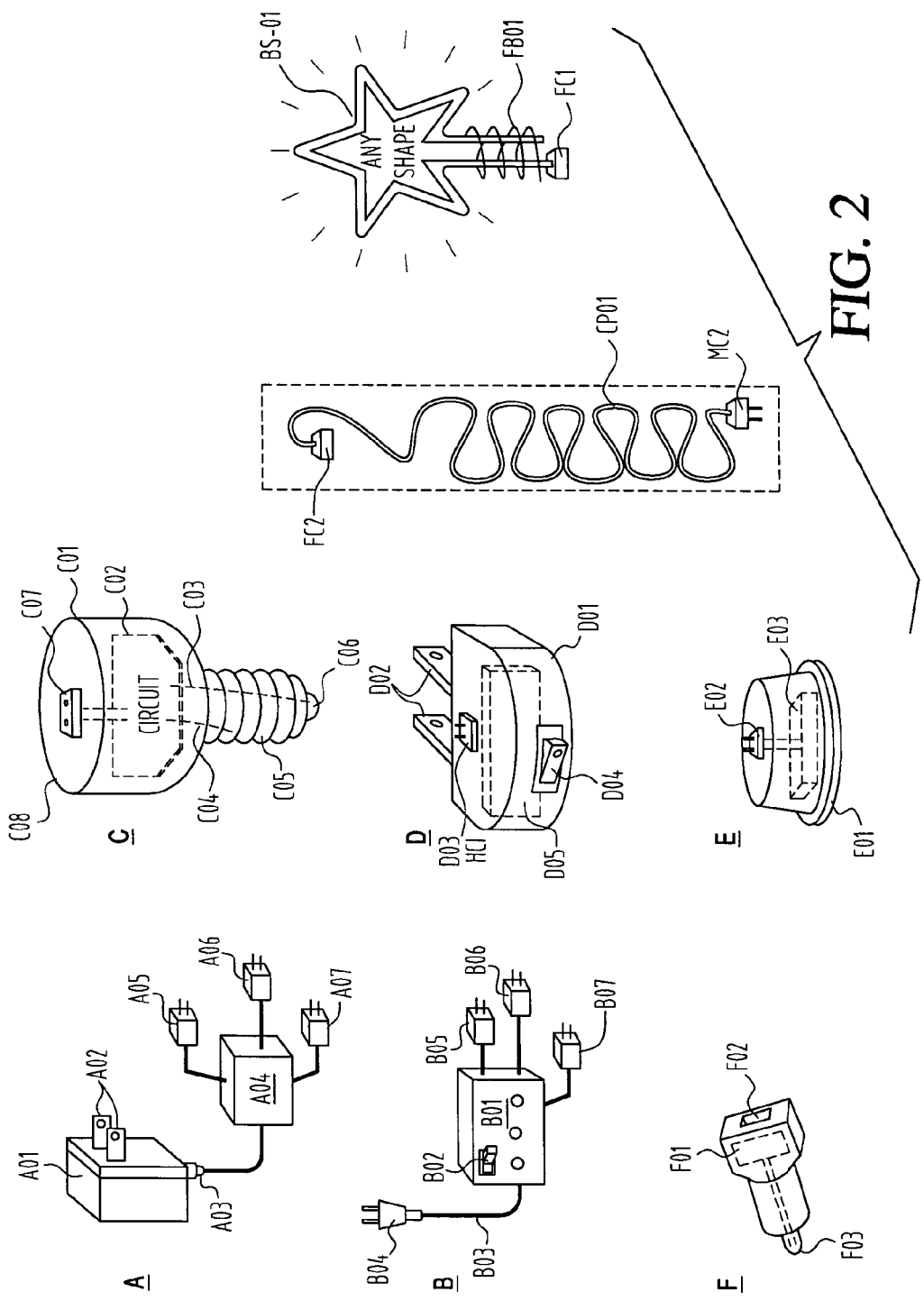

FIG. 2 is an isometric view of a lighting device with three-dimensional EL elements with different power sources, such as a Night Light device, UL listed transformer device, battery operated device, automobile cigarette lighter outlet, power box device, and/or lamp holder device, which provide the electricity power to drive the electro-luminescent elements' circuit to exhibit desired light effects, function, and brightness.

Figure 3:
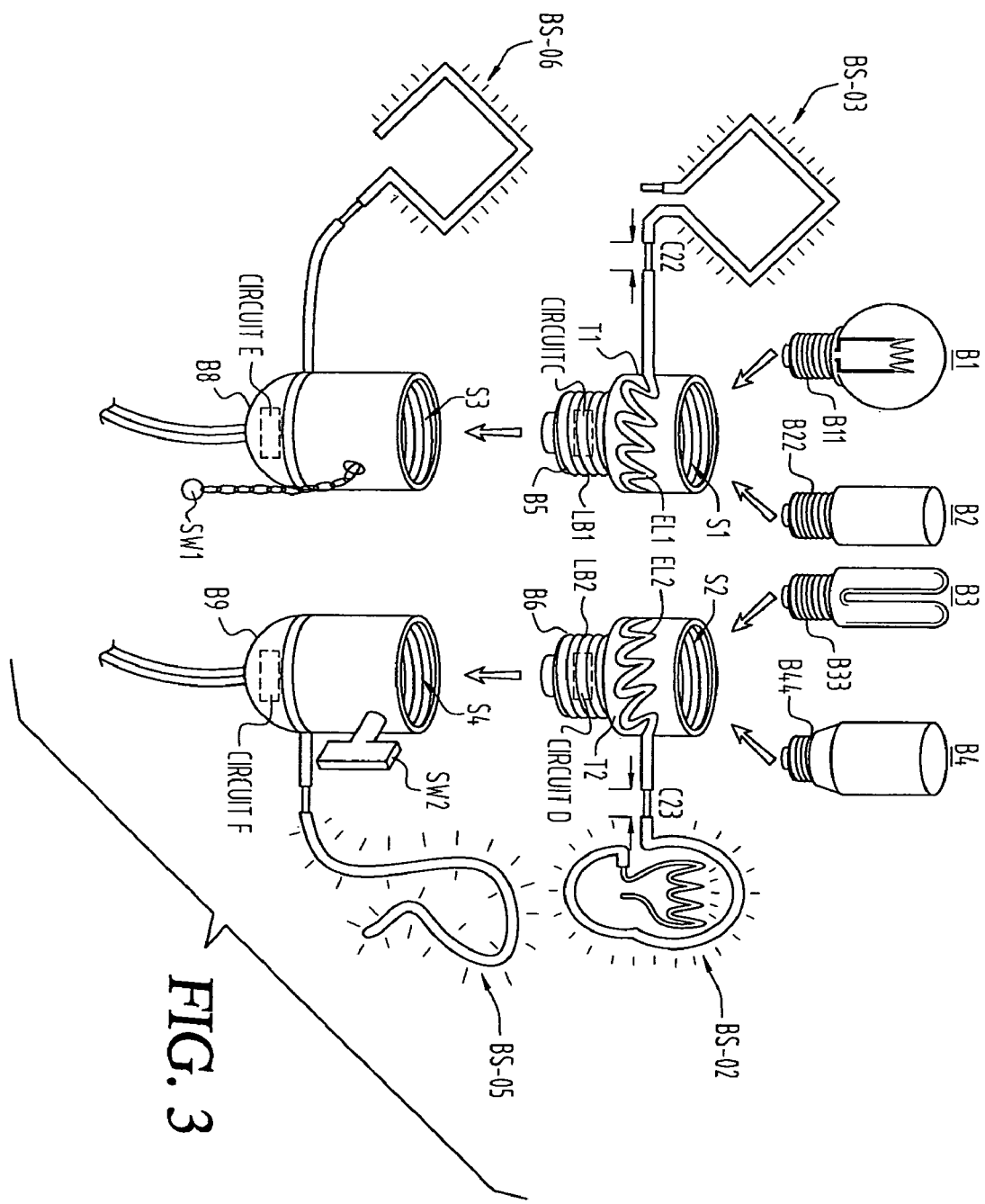

FIG. 3 is an isometric view showing the lamp holders of the inventor's prior art U.S. Pat. No. 6,182,282 compared with the inventor's current bend-and-shape electro-luminescent elements.

Figures 1, 4:
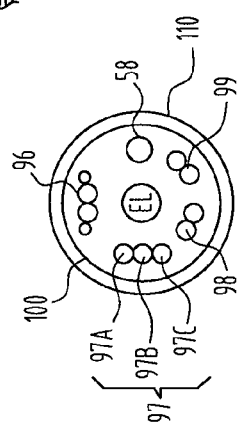
Figure 4:
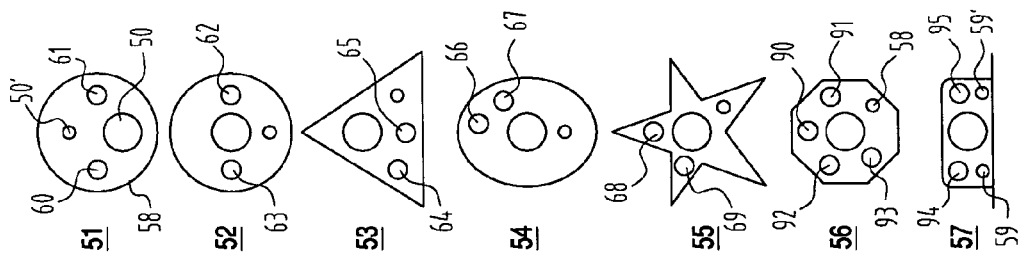

FIG. 4 shows cross-sectional views of an EL element with different geometric configuration of the bend-and-shape electro-luminescent element's construction, the EL element unit(s) and the bend-and-shape member(s) being located at a desired location so can make the best light performance.

FIGS. 4-1 is a cross-sectional view of the EL element with a different geometric configuration for a multiple function electro-luminescent element's construction. The multiple function EL element has electric signal delivery parts within the EL elements, which can delivery electric signals including phone signals, current for a light source, and/or digital signals for communication/computer/camera image, data, and/or sound etc. The electric signal delivery parts may has any number such as at least 1 to N, where N=any number as long as the number can be put within the element body.

Figure 5:
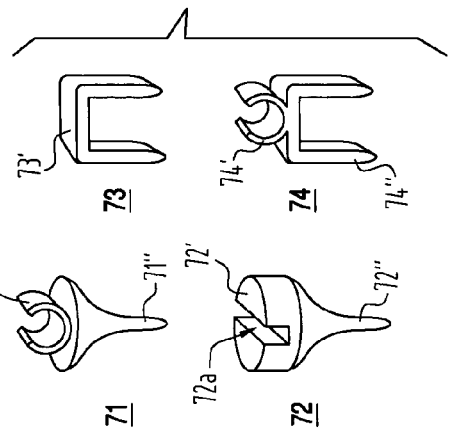

FIG. 5 is an isometric view of an assembly means to assemble the EL element(s) to ground or a wooden post for garden and patio application.

Figure 6:
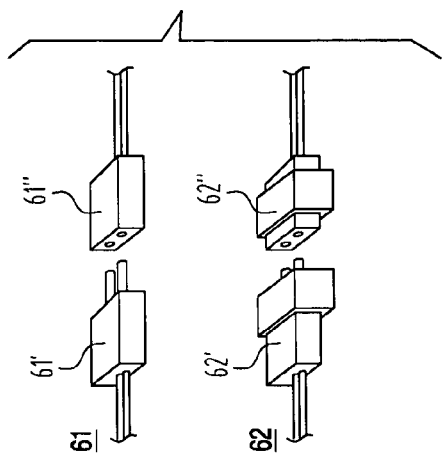

FIG. 6 is an isometric view of quick connector means for the current invention. Those skilled in the art will appreciate that the illustrated embodiments are by way of example only, and not intended to limit the current invention's scope and spirit. The quick connector enables the electro-luminescent elements and conductive-piece combination to have a desired length with certain sections offering illumination and others non-illumination for different locations in a home, building, garden, outdoor facilities, motor vehicles, bus, train, air-craft, boat, playground etc.

DETAILED DESCRIPTION OF THE PREFERRED EMBODIMENTS

The current invention is a light device with electro-luminescent (EL) elements having a very special arrangement which utilizes quick connector means to join a plurality of EL elements and conductive-pieces together for desired spacing to provide a certain length with illumination and certain length without illumination so as to keep the cost down and fit different light arrangements for a home, garden, indoor facility, home electric appliance, building, outdoor facilities, bus, train, air-craft, boat, playground, road application, highway application, motor vehicles, grocery, commodities, kitchen use, bathroom use, audio device, video device, mobile communication device, computer device etc. The inventor's U.S. Pat. No. 6,082,867 discloses an EL element in-series or in-parallel connection with a circuit but does not disclose the non-illuminated conductive-piece(s) within the application. The current invention provides that non-illuminated but electric conductive piece(s) are arranged in the application. The benefits to add this non-illuminated conductive-piece(s) with quick connector means provides the following improvement:

a. It makes illumination arrangement nice and neat: For example, it can be used to provide an under cabinet light device from a wall outlet power source. The illumination is only needed at the cabinet area, so the distance from wall outlet to cabinet should not have any illumination, and therefore this distance utilizes electric conductive-pieces which can deliver electricity but do not have illumination. Hence, this is nice and neat light arrangement. If the distance from wall outlet to the cabinet has illumination, the result will be very strange and no one likes such a light arrangement. The only solution is let the people do-it-yourself (DIY) by any combination of the conductive-piece(s)+quick connector mean(s)+and EL element(s) with desired length to make the best light arrangement for certain area illumination.

Without the non-illuminated conductive-piece(s) and quick connector mean(s), it is not possible to make the perfect light arrangement for illumination.

b. Cost saving: Some conventional tubular EL element are illuminated over the whole length from circuit to the end. This will result in a very bad light arrangement for certain areas as discussed in part (a), above. It also will be expensive. In the example of the cabinet light, the distance from wall outlet to cabinet requires at least six feet, which would be very expensive if illuminated over the entire length. If this 6 feet distance uses the conductive-piece for non-illumination, it will be very cheap and yet have a nice and neat light arrangement because illumination is not permitted from wall outlet to cabinet. Hence, the invention provides big cost saving for people.

FIG. 1 shows a variety of power suppliers from a wall outlet such as wall outlet transformer (01), which should be UL listed and meet all consumer safety standards with conductive-piece (01A) to connect with the circuit (01B) with multiple output ends (01C') and (01I'). The output ends can be any number depending on marketing requirements. The output end (01C') has a conductive-piece (01C) which is a non-illumination section that just delivers electricity from the output end (01C') to the connector end (C1) and delivers the electric signals to the EL element (01D) though the connector (C1) for illumination. The length (01C) of conductive-piece can be very long so as to allow a consumer to put the transformer (01) in a dry area such as under a patio, or it can have a super long length to reach to the spa pool area so as to save the cost from patio to spa pool. Extending from the edge of the spa pool will be an illumination section which uses the EL elements to follow the contour of the spa so this will save a lot of cost of the very expensive EL element material and provide the best function.

1. Combination of Conductive-Pieces and EL Elements for a Low-Cost and Nice and Neat Light Arrangement:

From FIG. 1, The output end (01c') includes a first conductive-piece having a certain length to connect with the first illuminated EL element (01D) with a certain length to illuminate a first area such as spa pool. Then, the conducive-piece (01C) is connected by the connector (C2) with a second non-illuminated conductive-piece (01E) with a certain length to provide a swimming pool illumination arrangement. Then, the connector (C4) is used to get a third non-illuminated conductive-piece (01G) to deliver the electric-signals to a third illuminated electro-luminescent element (01H) for provide illumination for a third area such as a Bar-B-Q area for desired illumination. As a result, the output end (01C') can provide a most economic light device to illuminate a spa pool, swimming pool, and bar-B-Q area from one single output end with properly applied non-illuminated conductive-pieces (01C) (01E) (01G) which cost practically nothing because these pieces (01C) (01E) (01G) are merely conductive means for delivery of electric signals from one end to the other end. The illuminated section (01D) (01F) (01H) is very expensive but there is no waste of this expensive material for the distance from patio to spa pool, spa pool to swimming pool, and swimming pool to Bar-B-Q because these area use the conductive-piece only. Hence, the combination of conductive-pieces and EL elements is very economical and simple. This is the one of the current invention's features.

From the output end (01I') one can extend the conductive-piece (01I) with desired length so illuminate the first area by EL element (01J). The first illumination arrangement may be used for a mail box and connected with the second illumination arrangement by EL element (01K), which with a super long length for garden pathway or more big area's illumination. Also extending from the output end (01L') are a plurality of conductive-pieces (01L) (01P) (01R) with connector (C9)

(C10) (C11) to connect with the illuminated EL elements (01M) (01Q) (01S) for short illumination lengths, then through the connector (C9') (C10') (C11') to connect with the conductive-piece (01N) to a spool length of EL element (01O) for illumination. in addition, four conductive-pieces (01T) extend from connector (c11') to connectors (C13 to C16), which connect to the illuminated EL elements (01U) (01V) (01W) (01X) for garden light posts illumination. In this embodiment, outlets (01C') (01I') (01L') provide a proper arrangement for the (1) conductive-pieces (2) connector means (3) and illuminated EL elements to provide the best cost saving and best light arrangement for any place which people stay.

The preferred embodiment uses desired lengths of non-illuminated conductive-pieces and illuminated EL elements joined by quick and waterproof connector means for indoor and outdoor applications. The number, length, functions, light effects, timing, and specifications of the illuminated EL elements or conductive-pieces and connector means are not limited by the above discussion. Any kind of the same or equivalent, similar, alternative, or replaceable device, kits, items, and/or products should be considered to still fall within the spirit and scope of the current invention.

The outlet device (02) is an electric control device that allows a wall outlet power source having a voltage of 110-250 Volt and a frequency of 60-120 Hz to replace the power source as above discussion (01) and (01B) with more control means such as (02C) (02D) (02E) (02F) (02G), to provide desired functions, timing, brightness, frequency, voltage. These functions may be the same as current inventor's other prior arts' functions, timing, brightness, frequency, voltage, effects.

FIG. 3 shows an EL lamp with a built-in EL element (03I) on top of the housing (03H). This is different than the inventor's prior U.S. Pat. No. 6,168,282, which has a lamp holder with lamp base and receptacles to allow the incandescent bulb (B1), fluorescent lamp (B2), PL tube lamp (B3), LED lamp (B4) or any other conventional commercially available light source with a lamp base to be installed. The prior art U.S. Pat. No. 6,168,282 lamp holder can receive any light source lamp into the receptacles and thereby connect to a power source for turning on the first light source lamp and at least one of the second light sources which belong to electro-luminescent elements. The El element (03I) has bend-and-shape features which people can bend into a geometric configuration that stays there until the next bend-and-shape action is applied to the said elements. The EL element is securely fixed on the housing (03H) and connected with inner circuit (03A) to obtain electric signals which cause the elements to light under pre-determined functions selected from steady on, fade in and fade out, flashing or other conventional light effects by incorporating a conventional Integrated Circuit (IC) and related electric components. The circuit is powered by the lamp base's (03B), which has a metal base (03J) and metal tips (03D) to connect with the electric power source while the lamp base (03B) connects with a lamp holder (not shown). In an alternative application, the EL elements have been bent into a star shape (04Q) and the shape is maintained until the next bend-and-shape action by a user. The EL element (04Q) uses connector means (C19) to connect conductive-piece (04N) with connector means (C18) on the other end.

The connector means (C17) on lamp base (04A) is female, as is the connector means on the (C19) of the conductive-piece. The connector means (C19) of the EL element is male, as is the connector means (C18) of the conductive-piece. Hence, the EL element in star shape (04Q) is kept away from the lamp base (04A) by a desired conductive-piece (04N). This also can be similar to the light device (03) while the conductive-piece (04N) is not in use. Hence, the conductive-piece (04N) is an optional part and can be used when people want to have a remotely illuminated star away from the lamp base (04A). The current invention specifies a light device with electro-luminescent (EL) elements as light device (03), EL element (03I) as light device (04), and EL element (04Q) which has a lamp base and EL element for the current invention. The EL element (03I) can be installed on the lamp base unit (03) or EL element (04Q) far away with lamp base unit (04).

An alternative embodiment includes at least one night light (04L), which has a pair of prong means (04J) to connect with the wall outlet's power source so that the power source supplies power to an inner circuit and delivers the electric signals to the female connector means (04K), which are connected with the male connector means (04M) and pass though the conductive-piece (04N) to the female connector means (04o) so as to connect with the EL element's male connector means (04S) to cause the element to provide illumination. This night light includes a bend-and-shape EL element (04Q) kept away from the housing (04L) by the conductive-piece (04N). The night light (04L) also can have bend-and-shape EL elements with male connector means (04S) to directly connect with the night light's female connector means (04K) so the EL elements will sit on the night light with bend-and-shape features to allow people to make any design for this brand new night light at any time whenever people want to create a new shape by simply bending the elements into the desired shape. one can also get power from a cigarette light plug (05A) and a motor vehicle's battery, and get into the inner circuit (05C) to offer the electric signals to the female connector means (05B) to connector with EL element's male connector to drive the EL element for illumination under pre-determined functions. This is great cost saving relative to conventional market models which do not have the conductive-piece with two connectors on each end. The conductive pieces offer a cost saving and also make a more attractive light arrangement because some sections do not need illumination, so the best solution is use the non-illuminated conductive-piece to make such arrangement. The prior art automobile interior accent light only has the EL element come out from the circuit without a connector means to quickly connect both the non-illuminated conductive-piece and illuminated EL elements. This kind of application will cause two defects: (1) Some areas have no need for illumination and, if such areas still have illumination, will be very ugly. The current invention uses the non-illuminated conductive-piece(s) to solve this problem. (2) The interior accent light is good for seat, door step, audio device, and carpet only. However, the prior application only has a single EL element from circuit to the end, which results in a waste of expensive materials and excessively high cost. The distance from seat to seat should be a non-illuminated area, and the best solution is use a conductive-piece to join EL elements on the two seats. Hence, the current invention overcomes these bad defects of the conventional prior application. Also, the seat, door step, audio device, carpet, dash board, shift knob, door frame have very limited length so a proper combination for the non-illuminated conductive-piece(s) will reduce the length of the very expensive illuminated EL elements and save a big money. This is very practical and benefits all consumers. The same concept applies to garden applications in which the non-illuminated conductive-piece(s) and connector means greatly reduce the length of un-necessary EL elements, as well as to home, vehicle, boat, and motor transportation equipment applications.

2. Bend-and-Shape Electro-Luminescent (EL) Element for Variable Shape as Wished:

FIG. 2 illustrates circuits (A04), (B01), (C02), (D05), (E03) incorporated with a UL listed transformer (A01), plug control box (B01), lamp base (C01), night light prong device (D01), battery operated device (E01) to get power from wall outlet (A02), plug (B04), lamp base (C05), night light prongs (D02), and battery (E03) so as to deliver the electric signals from the circuits (A04),(B01),(C02),(D05),(E03) to the EL element (BS01) by connecting male connector means (A05), (B05),(C07),(D03),(E02) to the female connector (FC1) on the one end of the EL element (BS-01). An optional conductive-piece (CPO1) with the female connector (FC2) and male connector (MC2) on each end can be added between the circuit and EL element (BS-01) to keep the EL element away from the circuit means location. The optional conductive-piece is optional and does not need to be used if consumers prefer the EL element on the circuit housing.

As shown in FIG. 2, the circuit for (A) application may be applied to a garden or outdoor application. The circuit (B) may be applied to a super long EL element application which uses a control box with multiple adjust/selection knobs to make proper light effects. The circuit (C) may be applied to all indoor and outdoor light means with lamp base application. The circuit (D) may be applied to all night light or wall outlet applications. The circuit (E) may be applied to all electric devices which have a battery inside for operation, such as a clock or home small electric appliance. The circuit (F) may be applied to all motor transportation equipment such as a car, van, bus, boat, air-craft etc.

These different application for (A), (B), (C), (D), (E), (F) show the circuit's power source as using different utilities for different places where people stay. This is the preferred embodiment, but does not limit the current invention's scope and spirit.

FIG. 3 shows and arrangement disclosed in the inventor's prior U.S. Pat. No. 6,168,282, including: (1) a lamp holder with EL element and (2) an adaptor device with EL element for the lamp holder. The current invention uses a corresponding EL light device with a lamp base which has the EL element as light means and a circuit installed on the lamp base to fit into all conventional light receptacles. For simplicity, such an element may be referred to as an EL bulb.

From FIG. 3, the prior art discloses that the lamp base (B5) and (B6) has a receptacle (S1) (S2) to allow an incandescent bulb (B1), fluorescent bulb (B2), PL light (B3), LED or neon light (B4) to be installed on the lamp holder. The current invention, on the other hand, includes an EL light device with an EL element, as also shown in FIG. 3, which does not have the Receptacle (S1) (S2) for receiving the other light means. The prior art is EL on the lamp holder. The illustrated embodiment is an EL lamp with a lamp base.

The EL light device with housing (B5) (B6) includes lamp base (LB1) (LB2) having EL elements (BS-03) (BS-02) as the sole light means. The lamp base (LB1) (LB2) has metal pieces to allow them to be connected with existing lamp holders (B8) (B9) with receptacle (S3) (S4) for other light means such as incandescent bulb (B1), PL element (B3), fluorescent bulb (B2), LED bulb (B4) with screw base (B11), (B22), (B33), (B44), or the like.

The current invention mainly includes housing (B5) (B6) with lamp base (LB1) (LB2) and a circuit (Circuit C) (Circuit D) securely installed inside the lamp base (LB1) (LB2) and connected with the EL elements (EL1) (EL2) (BS-03) (BS-02) for illumination when the lamp base (LB1) (LB2) is inserted into the existing lamp holder (B8) (B9) receptacles (S3) (S4) and the switch (SW1) (SW2) is turned to an "on" position.

The EL element (EL1) (EL2) can be installed within the grooves or glued on the surface depending on the design. The EL elements (BS-02) and (BS-03) are bend-and-shape EL elements as above discussion which can use the connector means (C22) (C23) to connect with electric signals. This will allow people to use the current invention's EL light device with lamp base to fit into all existing light devices with brand new EL lights having bend-and-shape El light features or regular EL elements for illumination.

The EL light device with lamp base is an EL bulb which can fit into a table light, ceiling light, doorway light, outdoor light, garden light, Christmas light, roof light, chandelier light, entrance light, PIR light, or solar light. Hence, this is very wide application for an EL light bulb or EL light device with lamp base.

FIG. 4 shows the construction of a bend-and-shape EL element having different outer shapes such as (51) round, (52) round, (53) triangle, (54) oval, (55) star, (56) stop sign shape, (57) flat. The inside of the element includes (a) EL units which may be the same as described in the inventor's U.S. Pat. No. 6,082,867 for a three-dimensional EL element or the same as co-pending application Ser. No. 10/286,871 directed to a tubular EL light device in which light is emitted at a variety of angles to a viewer; and (b) a bend-and-shape member such as metal wires of a certain diameter so that the metal wire's strength is bigger than a plastic strength so that the member can maintain a desired shape for a desired time period. The combination of the (a) EL unit and (b) shape member in element (51) has the EL unit (50) and shape member (50') both on the side, or the combination can be as indicated by elements (52) (53) (54) (55) (56) (57) The EL unit (50) and shape member (50') can be injected molded into the element (51) together as desired construction but are not limited to an injection process. for example, other electric wire sealing processes can be used to make a bend-and-shape EL element having the same function. The shape member (50') not only can be put inside the element (58) but also can be put on the outside within a groove to make proper arrangement (not shown) or the outer plastic construction can be used to make bend-and-shape element (58) as in a well-known drinking straw construction (not shown).

FIGS. 4-1 shows the cross section of the EL element (110) with the different geometric configurations (such as the above discussed shapes (51), (52), (53), (54), (55), (56), (57)) for the multiple function electro-luminescent element's construction. The multiple function EL element has the electric signal delivery parts (58) (96) (97) (98) (99) (100) within the EL elements (110), which can delivery electric signals including phone signals (96), current for a light source (98), digital signals (97) for communication/computer/camera image (97a), data (97b), and/or sound (97c), or a power source (99) etc. The electric signal delivery parts (96) (97) (98) (99) may have any number such as at least 1 to N (N=any number) as long as the parts can be put within the element body. The other functions such as the bend-and-shape member (58) also can be arranged within the EL element (110). It also may have other function, for example by included a reinforced mesh tube (100) within the EL element (110) to provide a super pulling strength for applications such as cargo rope, shoe lace, climbing rope which need the super pulling strength provided by the extra reinforced net tube within. One also can add elastic coil kits (not shown) within the elements to offer the coil type of wire harness such as earphone or telephone phone lines that are the same as conventional coil wires which keep the table nice and neat and can extend to a certain length when pulled but that will return to a coil when not being used.

The current invention for the multiple functions EL elements may have any combination of extra functions created by the (1) bend-and-shape member, (2) electric signal delivery parts, (3) reinforcing mesh tube, (4) elastic coil kit, (5) (6) other EL element kits and (7) other cosmetic accessories.

FIG. 5 shows an assembly means to assemble the EL elements into a ground, grass, mud, wood, or cement surface with the most simple, quick, and safe installation. The pin (71) with a tube holder (71') on top and the sharper pin tip (71") can easily be inserted into all kinds of surface such as grass, wood, and cement surfaces. The nail (72) which has a groove (72a) to hold the EL element may be installed by using a hammer to hit the upper surface (72') so the tip (72") can be easily driven into any hard surface such as cement, wood, grass, mud, dry ground etc.

The alternative shapes such as "reverse U shape hook" (73) and up-grade (74) also can be consider as assembly kits of the current invention.

FIG. 6 shows a connector means construction. The connector set (61) has a male half (61') and female half (61"). The connector set (62) has a male half (62') and female half (62"). These preferred embodiments are designed to have a compact size, easy assembly, waterproofing, a locking device, low cost, and to be capable of mass production. It will be appreciated that the same function, or equivalent function connector also will still fall within the current invention's concept and scope and spirit. These two types of connectors are not intended to limit the current invention, but are described solely for purposes of example.

The current invention includes an EL element(s) incorporated with non-illuminated conductive-piece(s) by connector means to deliver the electric signals from the circuit to make light effects and provide area illumination. It is appreciated that the EL element(s), conductive-piece(s) and connector means can be in any configuration, construction, model, and material and still fall within the current inventions scope and spirits for this EL element application.

Although preferred embodiments have been disclosed to help describe the current invention, it will be appreciated that any alternative or equivalent functions and design may still be within the scope of the invention, which is not limited to the above mentioned details.

The invention claimed is:

1. An electro-luminescent element arranged to emit light in a variety of directions, wherein said electro-luminescent element has bend-and-shape properties to permit the element to be bent by a user into a desired shape and to maintain the desired shape for a desired time period until a next bend-and-shape action is applied by the user to the element,
wherein sealed within said electro-luminescent element are (a) electric signal carrier means for supplying an electric signal that causes said electro-luminescent element to emit said light, and (b) bend-and-shape means separate from said electric signal carrier means for causing the electro-luminescent element to maintain the desired shape.

2. An electro-luminescent element arranged to emit light in a variety of directions, wherein said electro-luminescent element includes a coil forming a means that can be extended from a first length to a second length when pulled and that will return to the first length when no longer being pulled, said coil being arranged to supply an electric signal to an electric device other than the electro-luminescent element.

3. An electro-luminescent element arranged to emit light in a variety of directions, wherein the electro-luminescent element includes at least one reinforcing strain relief tube within a cross-section of the element to provide a means for preventing damage to the electro-luminescent element when the strain relief is pulled, wherein said strain relief includes conductive means for supplying electric signals to devices other than the electro-luminescent element.

4. An electro-luminescent element arranged to emit light in a variety of directions, wherein said electro-luminescent element is arranged to be connected by a quick-disconnect connector to at least one conductive piece arranged to be inserted into a receptacle of the lamp holder in place of a conventional lamp for delivering electric signals from a power source selected from the group consisting of a transformer, wall outlet, battery, lamp holder, cigarette lighter adaptor, extension cords, solar cell and chemical cell to the electro-luminescent element via the receptacle, the conductive piece, and the quick-disconnect connector, said conductive piece being non-illuminated to enable the electro-luminescent element to be positioned away from said receptacle without wasting expensive electro-luminescent materials.

5. An electro-luminescent element as claimed in claim 4, wherein the power source is a wall outlet.

\* \* \* \* \*